3,412,104
PRINTING INK PRODUCTION
Maurice Dwight McIntosh, Willoughby, Zenon Kazenas, Euclid, and Joseph L. Switzer, Gates Mills, Ohio, assignors to Switzer Brothers, Inc., Cleveland, Ohio, a corporation of Ohio
No Drawing. Continuation-in-part of applications Ser. No. 70,927, Nov. 22, 1960, and Ser. No. 274,791, Apr. 22, 1963. This application June 28, 1963, Ser. No. 291,272
7 Claims. (Cl. 260—33.6)

This is a continuation-in-part of Ser. No. 70,927, filed Nov. 22, 1960 (now abandoned), and Ser. No. 274,791, filed April 22, 1963, now abandoned.

The instant invention relates to printing ink production, and more particularly, to a method of producing an improved printing ink in the form of a dispersion of finely divided solid particles in a liquid vehicle, and the printing ink composition obtained by carrying out such method.

Although the instant invention may have applications in a number of fields, it is particularly useful in the manufacture of color compositions containing resin pigments. Such pigments may be used in the production of coating compositions (i.e. including paints, printing inks, silk screen colors, etc.) having many useful properties. The pigments are formed of normally solid resins in particulate form having dissolved, dispersed or fixed therein a suitable coloring agent, which in the case of daylight fluorescent color is a fluorescent dye dissolved or dispersed in the pigment in concentrations effective for daylight fluorescence (as more fully described, for example, in Joseph L. Switzer et al. U.S. Patent No. 2,653,109 and Zenon Kazenas U.S. Patents Nos. 2,809,954 and 2,938,873, incorporated herein by reference). An advantage of the instant invention, however, is that the concentrations of fluorescent dyes effective for daylight fluorescence may be materially increased (e.g. up to 10–15%) in the fine particles of the instant invention.

A remarkable improvement obtained in the preferred practice of the instant invention involves the production of ink compositions having extremely fine generally rounded or spheroidal dispersed phase pigment particles. This feature of the instant inks is manifested not only in improvements in a glossy appearance, but also in improvements in texture and brightness of color, as well as improvements in versatility of use of the compositions in ink fields, particularly, where the extremely fine particle size of the invention has made possible for the first time the successful use of single impression letter-press and litho ink formulations embodying high concentrations of the instant pigment resins, dyed forms of the instant pigment resins, and particularly daylight fluorescent pigment resins.

In addition, a fundamental aspect of the invention involving production of the dispersed pigment resin particles in situ in the vehicle phase is believed to involve unique chemical and/or physical phenomena involving and/or comparable to thorough wetting of the discrete dispersed resin particles with the vehicle in such manner as to impart improved results in paint and ink rheology (i.e. thixotropy, stability of suspension, etc.) and/or optical effects. Such improved results are manifested particularly with the most minute sized pigment particles of the invention.

It is, therefore, an important object of the instant invention to provide improved methods of manufacture and improved printing ink products comprising extremely minute and uniformly dispersed or dispersible resin particles.

It is another object of the instant invention to provide an improved method of producing a highly concentrated dispersion of extremely fine solid organic resin particles in a liquid vehicle, and an improved printing ink product resulting therefrom.

It is another object of the instant invention to provide an improved method of producing coating and ink compositions by the production of a dispersion of a normally solid organic resinous pigment, in extremely fine particulate form, being substantially uniformly sized and dispersed in a solid-film-forming vehicle.

Other and further objects, features and advantages of the present invention will become apparent to those skilled in the art from the following detailed disclosure thereof.

The invention consists in a superior printing ink composition consisting essentially of (1) 1 to 15 parts of a dispersed phase of substantially uniform fine generally spheroidal solidified particles formed essentially of substantially water-insoluble substantially translucent synthetic resin body, said body retaining a selective light absorbing agent and substantially preventing the agent from migration out of said body, said particles being substantially entirely in the size range of not more than 0.0003 inch (grindometer gauge), and if insoluble in the synthetic resin said light absorbing agent retained therein being preferably substantially entirely in the size range of not more than one-fifth the average particle size; and (2) 10 parts of a continuous liquid phase formed of a substantially translucent-solid-film-forming vehicle in which the dispersed phase is substantially insoluble.

The invention also consists in a process of producing a printing ink composition, which comprises the steps of (A) subjecting a dispersion of (1) a dispersed phase of substantially uniform fine globules formed essentially of substantially water-insoluble substantially translucent synthetic resin body in a (2) continuous liquid phase formed of a substantially-translucent-solid-film-forming ink vehicle (which is preferably hydrophobic), in which the dispersed phase is substantially insoluble, to time-temperature conditions effecting solidification of dispersed phase particles in the liquid phase in a size range of not more than 0.0003 inch (grindometer gauge); and (B) intimately dispersing in the dispersion a selective light absorbing agent which is retained by the resin body, in a size range of not more than one-fifth the average dispersed phase particle size.

The reference to ink pigment particle size in terms of the "grindometer gauge" is conventional; and the gauge herein referred to is a fine particle size (obtained in the following examples) adapted for printing ink uses involving the finest size pigments. The selective light absorbing agent or coloring agent employed herein is used in substantially finer sizes. In the case of inorganic pigments, the particle sizes used are not more than about one-fifth the gauge size specified, so that the inorganic pigments may be retained in the dispersed phase resin particles without significantly altering certain superior physical characteristics or features thereof (which include the generally spheroidal or rounded shape thereof). In the case of dyes, of course, the dyes are often dispersed or dissolved in the dispersed phase resin particles in substantially molecular sizes. A characteristic of the dyes and inorganic pigments used herein is that in the dispersion they are retained in the dispersed phase, in the resin body, and substantially prevented from migration therefrom back into the continuous liquid phase (or the continuous solid phase obtained after printing and drying of the ink).

It will be seen that the dyes or pigments employed as selective light absorbing agents herein may be added at the start of, early in and/or after the preparation of the dispersed phase resin component and/or before, during and/or after the dispersion of such resin component in the liquid phase and/or while the dispersed resin component is in liquid or solidified form in the ink dispersion. Often more than one dye is used to obtain a given ink color; and in such instances one of the dyes (e.g. Brilliant Yellow 6G) may be added to a reaction mixture for preparing an initial condensation product ultimately used to form a dispersed phase resin whereas another dye (e.g. Rhodamine) may be added during the final phases of the ink composition formation, i.e., during cooling of the dispersion to solidify the dispersed phase resin. In such latter instance, the dye is added to the dispersion and initially dispersed and/or dissolved in the continuous liquid phase but it migrates substantially to the dispersed phase resin (preferably but not necessarily prior to solidification thereof). In liquid form, particularly, the dispersed phase resin particles appear to attract and retain the dyes to form therewith an intimate homogeneous combination.

The characteristic tendency of such dyes and/or pigment materials to migrate to and be retained by the dispersed phase resins hereof is known per se (as more fully described, for example, in Joseph L. Switzer et al. U.S. Patent No. 2,653,109 and Zenon Kazenas U.S. Patents No. 2,809,954 and No. 2,938,873, incorporated herein by reference).

For ease of reference, particularly in the subsequent examples, the vehicle formulation used will be referred to a "vehicle X"; the dispersible product, which is initially dispersed in the vehicle X will be referred to as the "product X"; and the resulting dispersion obtained by carrying out the procedures of the invention will be referred to as "dispersion X." The dispersed phase in dispersion X is preferably different from the dispersible product X, having undergone changes during the instant procedure, and such dispersed phase may be thermoplastic or thermoset resin in discrete particulate form, but it is an organic synthetic resin that is normally solid, i.e., solid under ordinary conditions of use such as room temperature, etc. For convenience also the product X used in the practice of the invention may be referred to as consisting of, containing and/or producing (during the process of the invention) a "first" resin or the "pigment" resin. This dispersed pigment resin may be thermoset or it may be thermoplastic.

In certain instances, thermoplastic resins are preferred for use in the instant invention, and this type of resin will be considered first. Although the thermoplastic pigment resin preferred for this purpose is a co-condensate of an aromatic sulfonamide, a polyamino triazine and formaldehyde, such as is described in Zenon Kazenas U.S. Patents Nos. 2,809,954 and 2,938,873, it will be appreciated that other thermoplastic organic resins may be used and/or produced in situ in the practice of the instant invention. For example, one may use thermoplastic resinous condensates of formaldehyde and aromatic sulfonamides such as o-toluenesulfonamide, p-toluenesulfonamide, mixtures thereof, benzenesulfonamide and alkyl derivatives thereof, in which the sulfonamido group is attached directly to the aromatic nucleus through the sulfur atom and there are two reactive amide hydrogens, as well as the corresponding alpha toluenesulfonamide compounds.

In addition, the thermoplastic pigment resin which may be used and/or produced in situ in the dispersed phase in the practice of the instant invention may be a co-condensate formed of an aromatic monosulfonamide component, a formaldehyde (or paraformaldehyde) component, and a polyamino resin forming component, which is a compound containing a plurality of amino (or amido) groups each attached to a carbon atom which in turn is attached through a double bond to an oxygen, sulfur or nitrogen atom. The last mentioned compounds include urea (wherein two amino groups are attached to a carbon atom which in turn is attached to oxygen by a double bond), thiourea (wherein two amino groups are attached to a carbon atom which in turn is attached to a sulfur atom by a double bond), and guanidine (wherein two amino groups are attached to a carbon atom which in turn is attached to an NH group by a double bond). Such polyamino compounds (often also referred to as "polyamido" compounds) ordinarily form thermoset resins with formaldehyde; but in the practice of the instant invention they are preferably used in co-condensation products with aromatic sulfonamides in such proportions as to produce a thermoplastic resin, in accordance with the general teachings of the aforementioned Kazenas patents.

Other polyamino compounds which may be used for co-condensation include dicyandiamide, biuret, etc. Preferred polyamino compounds for use in the practice of the instant invention are, however, compounds wherein the molecule has a plurality of $NH_2$ groups each connected to a carbon atom contained in a heterocyclic ring, said carbon atom being connected by a double bond to an intercyclic nitrogen atom. The heterocyclic rings thus include triazole, diazole, diazine and triazine rings. Such compounds include guanazole, 1-phenylguanazole, 4-aminoquanazole, 1-carbamylguanazole, 1-guanylguanazole, 1-acetylguanazole, 1-benzoylguanazole, 2,4-diamino-6-hydroxypyrimidine, melamine and the guanamines such as those desclosed in Kazenas Patent No. 2,938,873.

Another group of compounds which can be used in the preparation of thermoplastic pigment resins for use hereunder are condensation products of the cyclic ureides (i.e. also "heterocyclic" compounds) such as dimethyl hydantoin with formaldehyde alone or with formaldehyde and the other polyamino and/or aromatic sulfonamide compounds previously described (Example 12, infra).

The formaldehyde component used may be formaldehyde or a derivative thereof such as paraformaldehyde, hexamethylene tetramine, or the like.

As mentioned, the thermoplastic pigment resins preferred for use and/or productions in the practice of the instant invention are those described in Kazenas Patents Nos. 2,809,954 and 2,938,873 (which patent disclosures are included herein by reference), wherein the polyamino component is a polyaminotriazine component, defined in such patents as an aminotriazine having at least two amino groups.

The amount of such polyamino component in the thermoplastic pigment resin is preferably an amount insufficient to render the resin thermoset, but sufficient to impart substantial insolubility to the resin in common petroleum solvents, which are often used in paint vehicles.

Although the process of the instant invention may result in the formation of dispersed minute particles of thermoset resin, it will be appreciated that once the resin is completely thermoset, the resin does not undergo any further changes in size or shape. It will also be appreciated that if the product X comprises an extremely heat sensitive, rapidly thermosetting resin, this material must be dispersed initially with great care in the practice of the instant invention, so that the desired dispersion may be carried out before the resin becomes thermoset. Also, it is often useful to prepare a product X of this type (for the formation in the ultimate dispersion X of either a thermoplastic or thermoset resin) in a form in which it is not too readily converted to the finally desired condition of the resin dispersed in the ultimate dispersion X. It may be advantageous in many instances, thus, to prepare an initial condensation product X for the dispersed phase that has less than the amount of formaldehyde herein specified, to process (initially or completely) the dispersed phase in accordance with the instant invention, and then add to the system additional formaldehyde or formaldehyde-generating material which will in turn react with the dispersed phase resin to effect the formation of a completely condensed pigment resin having a higher softening point than the starting material and improved light stability and other improved properties.

The continuous phase or vehicle X, in which the aforementioned product X is dispersed in the practice of the instant invention, for example, is a solid-film-forming viscous liquid vehicle (capable of forming a translucent film, and preferably a substantially transparent, clear film). Increased viscosity in the continuous liquid phase materially assists in effecting the desired dispersion and formation of uniform particle size of the dispersed phase during agitation in accordance with the practice of the invention. The liquid vehicle forming the continuous phase is a material in which the dispersed phase is substantially insoluble under the conditions of the process steps of the invention. Preferably, the product X and the vehicle X are substantially mutually insoluble, and in the ultimate dispersion X, the dispersed resin is substantially insoluble in the vehicle X. In other words, the dispersed (pigment resin) phase is substantially insoluble in its normally solid form (as well as in its molten form, if thermoplastic) in the continuous vehicle X phase (when the same is in its original liquid form or when it is in its ultimate solid-film form).

In general, the continuous phase consists essentially of or comprises a binder for the pigment or dispersed phase. It is ordinarily liquid at room temperature as well as the other temperatures employed in the pratice of the invention, usually being a viscous liquid material that is solidifiable in whole or in part in ultimate use, in that it is a solid-film former of the type used in coating compositions, paints, inks, etc.

Typical examples of the continuous phase preferred are ordinary vehicles of the paint and ink trade, such as oil modified alkyd vehicles, styrenated alkyd vehicles (substituted or unsubstituted styrenes), cyclized rubber vehicles, and the like all of which contain petroleum solvents, drying oils and/or similar liquid solvents.

Preferably, the continuous phase is formed of an organic resin dissolved in a liquid solvent therefor. One aspect of the instant invention involves maintaining in solution in the liquid continuous phase an organic resin (hereinafter often referred to as the "second" resin or "solid-film-forming" resin) to maintain a substantial viscosity in the continuous phase, thereby to effect, in combination with the agitation, a shearing action to bring about the desired reduction of the molten dispersed phase to a substantially uniform fine particle size. The proportion of such second resin employed in the liquid phase affords a control for the viscosity in the liquid phase in the practice of the invention. The continuous phase may be formed of varnish compositions containing solid-film formers such as vinyl toluene and styrene copolymers, etc. Modified phthalic anhydride linseed oil, soya oil or dehydrated castor oil alkyd varnishes and the like may be used. Preferred for use in the practice of the invention are styrenated oil-modified alkyds such as those described in U.S. Patents Nos. 2,919,253 and 2,944,991, in which oil-modified alkyds copolymerized with styrene and/or ring substituted alkyl or halostyrenes are disclosed; the term "styrenated" as herein used shall be understood to include modification by styrene as well as ring substituted alkyl or halo-styrene.

EXAMPLE 1

Using a heated container set at 150° C. and a conventional high speed disperser, a charge of 0.04 mol of borax (decahydrate) is dissolved in 20 mols of water at approximately 90° C. Then 2 drops (per 75 g. of resin solids yield) of 70% aqueous phosphorous acid is added. The phosphorous acid is preferably employed to improve the dye function and as a chelating agent for any iron impurities in the reaction mass.) A charge of 7 mols of 91% (active) paraformaldehyde (flake form) is then added slowly with continuous stirring. Brilliant Yellow 6G base [1] is added now in an amount equal to 2% of the resin solids yield. A charge of 1 mol of melamine is then added with stirring; next a charge of 3 mols of a mixture of o- and p-toluenesulfonamide is added and heated up to about 100° C., until the mixture is completely dispersed (i.e. to obtain a substantially homogeneous, aqueous, hydrophilic, incompletely condensed or dehydrated, substantially A-stage reaction product), thereby obtaining what is herein referred to as "product X."

A vehicle herein referred to as "vehicle X" is formed separately thoroughly mixing 10 parts of boiled linseed oil, 25 parts of a 100% solids in the form of 10% styrenated alkyd A (formed of glycerol esterified with semi-drying oil dehydrated castor oil) copolymer resin hereinafter referred to as vehicle resin S, and 45 parts of an ink vehicle hereinafter referred to as "blend Y" consisting essentially of 44% solids in the form of 50% styrenated alkyd A copolymer resin ("Cycopol") and 56% of a high boiling (about 240° C.) saturated aliphatic hydrocarbon ink solvent (commercially available as "Inkol-O"), to form a uniform, hydrophobic organic liquid vehicle capable of forming a solid film on drying (i.e. a solid-film-forming vehicle). Vehicle X and product X are substantially mutually insoluble.

A charge of 80 parts of vehicle X at room temperature is added to a charge of 105 parts of product X at about the boil (preferably it is not allowed to stand for long at temperatures of 100° C. or more because the condensation may be carried too far for most purposes in the subsequent steps) in the above noted conventional high speed paint mill, which is operated at high speed to form an initial uniform "product-in-vehicle" emulsion (i.e. an emulsion wherein product X is intimately dispersed in the continuous phase formed by vehicle X, as in a water-in-oil emulsion). Agitation is continued until a thin film of the emulsion smeared or rubbed on glass transmits light like a clear stained glass window (with or without dyes), which is the "smear test" considered to be an adequate test for uniformity. The mill is continued at high speed and the emulsion is heated to substantially 140° C. and held at 135–140° C. for about 15 minutes, at which temperature the emulsion is held with continued high speed agitation until volatiles are no longer being given off (i.e. as evidenced by foaming, which is evidence of advancement of the amine-aldehyde resin-forming condensation and dehydration reaction toward completion). Then, an additional organic liquid charge of 3.2 parts of "Inkol-O" is added to the emulsion, and thoroughly mixed for 5 minutes with high speed agitation. The emulsion is then dumped and cooled to room temperature, to obtain a resulting dispersion herein referred to as "dispersion X."

If no dye is used in the foregoing procedure, the resulting dispersion X is a clear material that may be used as a "clear" overcoat to deposit a high gloss film on coated or uncoated surfaces or it may be sold to distributors or even end users who desire to blend their own dye formulations to form inks, paints, etc. In the instant procedure, a dye formulation is used to obtain a printing ink composition. The yellow dye is added as described herein during formation of product X, and the red dyes are added during heating of the agitated emulsion prior to the previously described cooling to obtain dispersion X. As the agitated and heated emulsion reaches 105° C., a charge of 0.75 part of Rhodamine B Extra (Colour Index No. 749) is thoroughly dispersed therein; and as the temperature reaches 125° C., a charge of 4.50 parts of Rhodamine 6 GDN (Colour Index No. 752) dye paste Y is dispersed therein. The dye paste Y is made by dispersing 33.3 parts of Rhodamine 6 GDN in 23.2 parts of Inkol-O and 43.5 parts of the aforesaid vehicle resin S.

As used herein the terms "parts" and "percent" mean parts and percent by weight, unless otherwise designated; and reference to "mols" means the parts corresponding to a molar proportion, e.g., if parts are grams in a given run, then one mol of paraformaldehyde or formaldehyde is one gram mol, i.e., 30 grams, or 30 parts by weight.

The dispersed phase amine-aldehyde resin particles in

---

[1] Although the dye Brilliant Yellow 6G base is the correct name, this dye is sometimes referred to herein merely as "6G."

dispersion X resulting in the initial run are so small that 1000 power magnification does not give particle resolution; but electron microphotographs at 30,000 power indicate that by far the bulk of the dispersed particles are substantially spheroidal particles in the submicron range: 0.01 to 0.02 micron (i.e. 100 to 200 Angstrom units in diameter).

EXAMPLE 2

A charge of 160.5 grams of a mixture of o- and p-toluenesulfonamide, 0.7 gram of hexamethylene tetramine and 15.38 grams of paraformaldehyde (95% active) was heated with stirring to a temperature of about 112° C. and then a charge of 39.2 grams of a B-stage unmodified melamine-formaldehyde resin (Resimene 814) was added with further stirring and the reaction mixture was raised to a temperature of 176–178° C., held there for seven minutes, and permitted to cool to room temperature. The resulting resin has a softening point of 96.5° C. and is a brittle friable material that is ground into a powdered form.

A charge of 200 parts by weight of the aforementioned powdered resin and 180 parts by weight of an ink vehicle, consisting essentially of 44% by weight of styrenated alkyd copolymer resin (Cycopol) and 56% by weight of a high boiling (about 300° C.) saturated aliphatic hydrocarbon ink solvent (commercially available as "Inkol-O") is blended in a Pony mixer and then placed in a conventional high speed paint dispersing mill in which it is heated up to a temperature of about 100° C. as a result of the dispersing effect of the mill on the charge. Operating the mill then at low speed, an additional charge of 100 parts of weight of the powdered resin is added to the mix, and the mill is then operated at high speed to allow the mixture or dispersion therein to rise to a temperature of 165–170° C., which takes about 15 to 20 minutes. Cooling water is then applied to the mill to reduce the temperature of the dispersion therein to about 150° C., and the mill is cut back to low speed and a charge of 54 parts of boiled linseed oil is then milled into the dispersion, and it is cooled to approximately room temperature.

In the resulting dispersion, it is found that the particle size of the melamine-sulfonamide-formaldehyde resin dispersed phase is about 80 to 90% within the range of 2 to 5 microns, with substantially no particle sizes above 6 microns or below 1½ microns.

The resulting dispersion is in the form of a concentrate, which is diluted to approximately 50 weight percent of pigment resin solids with Inkol-O in order to obtain a material of composition suitable for use as printing ink.

In the manufacture of printing ink, it will be appreciated that conventional dryers, flow control agents, etc. are also added. In addition, of course, the coloring material must be added. Using the process just described, if a dye combination of 2.73 grams of Brilliant Yellow G Base (4-amino-1, 8-naphthal-2′, 4′-dimethylphenylimid) and 1.05 grams of Rhodamine 6GDN Extra (Colour Index No. 752) and 1.29 grams of Rhodamine B Extra (Colour Index No. 749) is added during the resin preparation as more fully described in U.S. Patents No. 2,809,954 and 2,938,873, the results obtained are the same as those just described except that the melamine-sulfonamide-formaldehyde resin dispersed phase ultimately obtained is in the form of spherulized pigment particles which retain the dyes and which exhibit an orange color that is strongly daylight fluorescent when the final ink product is applied to surfaces by various printing methods. In addition, if instead of adding the dyes during the resin preparation, these dyes are added to the mixture in the Pony mill prior to the vigorous agitation, it is found that during the agitation the dyes migrate to the molten melamine-sulfonamide-formaldehyde resin particles in the dispersed phase, which absorb or otherwise retain the dyes so as to form colored pigments, having the particles size properties hereinbefore described. This procedure has the advantage that the end user of a pigmented composition, such as the instant ink composition, may purchase the pigment resin in uncolored form from a supplier and then effect the coloring thereof with the desired dye or dye combination, while carrying out the method of the instant invention for obtaining a dispersion of the pigment particles of uniform size. The pigment resin in the dispersed phase is capable of retaining the dye in concentrations effective for daylight fluorescence and is further capable of selectively absorbing the dye from the continuous phase, so that the resulting ink composition holds substantially all of the dye within the dispersed pigment particles.

EXAMPLE 3

A charge of 30 g. of a long soya oil alkyd 50% solids (Duraplex DX 656), 0.5 g. Rhodamine B Extra and 50 g. Resinous polylol X–450 (a resinous polyhydric alcohol of the general formula:

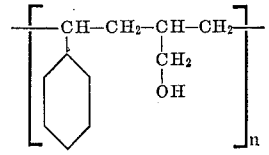

produced by Shell Chemical Corp.) are heated with stirring to 130° C. when resin finally dispersed in small particle size. Heat is removed and with stirring 20 g. mineral spirits added. This concentrate can be diluted further and driers and the like added to produce an ink.

EXAMPLE 4

A charge of 30 g. of a 44% solution of a styrenated alkyd in Inkol-O, 0.5 g. Rhodamine B Extra and 50 g. of Epon 1004 (a condensation polymer of epichlorohydrin and bisphenol-A of the general structure

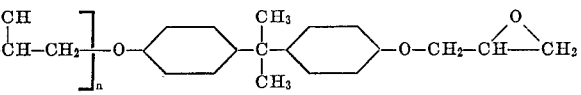

with a melting point of 95–105° C. and an epoxide equivalent of 1900–2450 produced by Shell Chemical Corp.) are heated with stirring to 140° C. and held until the pigment resin is dispersed. Heat is removed and as cooling 10 g. boiled linseed oil and 5 g. Inkol-O are slowly stirred in. This concentrate can be diluted and driers and the like added to produce a satisfactory ink.

EXAMPLE 5

A charge of 160.5 g. of mixed o- and p- toluenesulfonamide and 0.7 g. of hexamethylene tetramine were melted to 112° C. A charge of 201.5 g. of Cadmium Selenid Medium Red Pigment No. 1422 (Harshaw Chemical Co.) was dispersed and then 32.6 g. of paraformaldehyde (95% active) was added slowly with stirring. Then a charge of 29.0 g. of B-stage unmodified melamine-formaldehyde resin was added and the temperature allowed to rise to 180° C. where it was held for 10 minutes.

A charge of 30 g. of a 44% solution of a styrenated alkyd in Inkol-O and 50 g. of the above resin were vigorously agitated with heating to 175° C. and held for 10 minutes. On cooling there was added, with mild agitation, 10 g. of boiled linseed oil and 10 g. of Inkol-O. The resultant concentrated material can be used to make a conventional printing ink by the addition of driers, thinners and the like. 2.4 parts of the concentrate was diluted with 2 parts Inkol-O and 1 part of xylol and observed under a 400 power microscope. It appears that the inorganic pigment has been retained by the sulfonamide-formaldehyde melamine resin rather than migrating to the ink vehicle.

It will be appreciated that the final particle size in this example is dependent upon the particle size of the pigment used to color the resin. The final particle cannot be smaller than the colored pigment particle. Accordingly, it is necessary to use coloring pigments with a very fine particle to obtain uniform fine particle size in the concentrate and in the finished ink.

In the practice of the instant invention, the temperature employed during agitation and particularly the maximum temperature, is a significant factor in controlling the average particle size ultimately obtained. Thermoplastic resins do not ordinarily have a sharp melting point and the fluidity of such resins in the molten state is increased as the temperature thereof is increased. In the practice of the invention it is ordinarily preferable to employ a maximum temperature during the vigorous agitation in the range of approximately 50 to 100° C. above the softening point of the pigment resin. In the practice of the instant invention, the mode, speed, intensity and duration of the agitation during the dispersing step are further factors in controlling the average particle size ultimately obtained. Generally speaking, longer and more vigorous agitation, at the high temperature, leads to smaller particle size.

EXAMPLE 6

The invention may also be used to prepare a process ink series, involving the preparation of pigments of the three primary colors using thermoplastic or thermoset resins in the ultimately formed dispersion X.

In the formation of a series believed to be thermoset, a charge of 35 grams of water, 1.5 grams of borax (decahydrate) and 2 drops of 70% aqueous phosphorous acid is heated up to 90° C. with stirring; and a charge of 24.7 grams of formaldehyde, in the form of 91% paraformaldehyde, is added slowly with stirring to obtain a uniform dispersion, which is then heated up to 90° C. Next, a charge of 16.4 grams of melamine is dispersed in the reaction mixture, and then a charge of 44.4 grams of a mixture of o- and p-toluenesulfonamide is dispersed in the reaction mixture with heating up to about 100° C. until the melamine is completely dispersed in the reaction mixture. In this process ink resin preparation, the dye is added to the reaction mixture just after the paraformaldehyde has been dispersed therein, and in this case 11.3 g. of Brilliant Yellow 6G is thoroughly dispersed in the reaction mixture just after the formaldehyde is dispersed therein and before the melamine is dispersed therein; and the resulting material is a yellow process ink product X.

A procedure is repeated that is the same as that described in the previous paragraph, except that the yellow dye used is Fluorol 7GA, and the result is a second yellow process ink product X.

A procedure is repeated that is the same as that described in the previous paragraph, except that the yellow dye used is Thioflavine T.N.C., and the result is a third yellow process ink product X.

A procedure is carried out that is identical to that of the previous paragraph, except that the dye used is Rhodamine 6GDN, and the resulting material is a red process ink product X.

The procedure of the previous paragraph is carried out, except that the dye used is "Lithosol" Brilliant Blue E, and the resulting material is a blue process ink product X.

A procedure is carried out that is the same as that of the previous paragraph, except that the dye used is "Lithosol" Blue 6G, and the resulting material is a second blue process ink product X.

Vehicle X is prepared by thoroughly mixing a charge of 73 parts of the previously described blend Y, and 16 parts of tung oil. Such vehicle X at approximately room temperature is added to the product X of each of the previous paragraphs of this example, at about 95° C., and the mixture is then emulsified by agitation in the paint mill, first at a temperature of about 95° C. and then with heating up to 140° C., at which temperature the reaction mixture is held with continued violent agitation until the condensation-dehydration reaction appears to be complete and a small charge of a mixture of Inkol-O is added to replace evaporated solvent and to obtain an approximately 90% solids process ink dispersion X, having a color depending upon the previously selected color of the product X.

Vehicle X may also be prepared by thoroughly mixing a charge of 78 parts of the previously described blend Y and 13 parts of tung oil.

Vehicle X may also be prepared by thoroughly mixing a charge of 71.3 grams of the previously described blend Y and 18.7 parts of tung oil.

Alternately, vehicle X is added (in the paint mill) to product X and the resulting material is emulsified in the paint mill at a temperature of 105 to 110° C., with violent agitation for 10 to 15 minutes, and the resulting material is then colled to room temperature to obtain a resulting dispersion X. In such dispersion X, the pigment resin is probably in the thermosetting stage. Such dispersion X may be applied and heated either at the time of or after application and then cooled after the conversion of the pigment resin to the "thermoset" stage.

In this way the three primary color process dispersions X may be prepared in form for distribution to end users. It will be appreciated that the resulting ink formulations (as well as those made from the other examples herein) may have conventional ink additives added thereto, for example, on a three roll ink mill by the addition of approximately a total of 7% of conventional ink additives such as driers, varnish, stearates, Acrowax C, etc., in order to obtain the desired viscosity and other properties for ink use.

EXAMPLE 7

In the preparation of the corresponding primary color process ink pigments believed to be made from different resins, a charge of 35 grams of water, 1.5 grams borax (decahydrate) and 2 drops of 70% aqueous phosphorous acid is first warmed to 90° C., and a charge of 22.1 grams of 91% paraformaldehyde is then added slowly with stirring and heating up to about 90° C. in order to obtain a complete dispersion of the paraformaldehyde. Next, a charge of 11.25 grams of Brilliant Yellow 6G is added to the reaction mixture and thoroughly dispersed therein with stirring. Then, a charge of 12.6 grams of melamine is dispersed in the reaction mixture; and then a charge of 51.3 grams of mixture of o- and p-toluenesulfonamide is added thereto and dispersed with continued stirring and heating up to 100° C., to obtain a yellow product X, which is then cooled to 95° C.

A second process yellow product X is formed by carrying out the procedures of the previous paragraph using Fluorol 7GA as the dye.

A red process product X is prepared by carrying out the procedure of the previous paragraph using Rhodamine 6GDN as the dye. A blue process product X is prepared by carrying out the process of the previous paragraph using, as the dye, "Lithosol" Brilliant Blue E and/or "Lithosol" Blue 6G.

The emulsion is formed by adding 80 parts of the previously described blend Y to one of the products X just described, being maintained at about 95° C., and the resulting emulsion is agitated violently for 15 to 20 minutes with moderate heating at temperatures within the range of about 100 to 105° C., at which time the condensation reaction will have advanced but will not have involved the complete conversion of the resin. The makeup solvent charge then added is 13.5 grams of pale "H" linseed oil, and the emulsion is then heated up to about 145° C. with violent agitation until the condensation reaction has apparently been completed. Then a makeup solvent in the form of Inkol-O is added to obtain a 90% solids dispersion X.

The dispersion X of the previous paragraph may be milled with conventional ink additives and applied as such in a printing process.

Alternatively, the emulsion just described may be heated up to 145° C. (instead of the lower temperature of 105° C.) with violent agitation after addition of the linseed oil until the condensation reaction has apparently been completed, and then a makeup solvent in the form of Inkol-O is added to obtain a 90% solids dispersion X. Such dispersion X may also be used to provide the necessary color for process ink use.

The theory of the amine-aldehyde (or amide-aldehyde) condensation reaction (and particularly the resin-forming reaction) is well known, involving the reaction of an aldehyde such as formaldehyde with a compound containing a —$NH_2$ group, for example, either attached to an S atom that is in turn attached by a double bond to O (as in toluenesulfonamide) or attached to a C atom that is in turn attached by a double bond to O, S or N. In general, the reaction is advanced as indicated in the following equations:

Initial methylol condensation-addition:

(1) $\quad$ HNH + $CH_2$O $\longrightarrow$ HNCH$_2$OH

Advancement of condensation-dehydration reaction to dimer:

(2) $\quad$ HNCH$_2$OH + HNCH$_2$OH $\xrightarrow{H_2O}$ HNCH$_2$NCH$_2$OH

Advancement to trimer:

(3) $\quad$ 2HNCH$_2$OH + HNCH$_2$OH $\xrightarrow{2H_2O}$ H(—NCH$_2$—)$_2$—NCH$_2$OH Advancement (polymerization) to polymer (generically):

(4) $\quad$ nHNCH$_2$OH + HNCH$_2$OH $\xrightarrow{nH_2O}$ H(—NCH$_2$—)$_n$—HC$_2$OH wherein $n$ is a small integer. Although some students of the reaction hold that the trimer of, for example, the toluenesulfonamide-formaldehyde reaction is already substantially dehydrated, being formed of three

—N—CH$_2$— groups is in a six-membered ring (without any methylol groups left), it is agreed among resin chemists that at least the initial phases of the condensation reaction involve the characteristic reaction of methylol amine (or amide) groups to combine separate molecules through a methylene linkage and to release water of condensation, and the term "condensation-dehydration" reaction is applied thereto.

The "condensation reaction" sequence herein involves the initial "addition" step (Equation 1) which we have designated as "condensation-addition" as well as the subsequent steps wherein a volatile such as water is split off during the combination of molecules in what we have designated as the "condensation-dehydration" (e.g. Equations 2, 3 and 4).

The first evidence of any sort of reaction between the amine and aldehyde, in an aqueous system, occurs when the amine (which is usually not very water-soluble per se) appears to dissolve in the presence of the aqueous formaldehyde (e.g. in the case of melamine-formaldehyde condensates). For purposes of definition herein, this then becomes the earliest stage of the "amine-aldehyde resin-forming reaction condensation product." It is conceivable that at this early stage the formaldehyde functions primarily as a solvent, but the practical effect (and as most authorities agree the actual effect) is that some initial combination of materials takes place, probably along the lines of Equation 1 and partially Equation 2. The materials are uniformly distributed throughout the aqueous system.

Another species of condensation-dehydration reaction between methylol amine groups may be represented as follows:

(5) $\quad$ HNCH$_2$OH + HOCH$_2$NH $\longrightarrow$ HNCH$_2$OCH$_2$N— but most authorities now conclude that this species (5) is less competitive than species (2), or takes place only to a very nominal, if any, extent. In any event, it is an essentially condensation-dehydration reaction, which in a subsequent step such as:

(6) $\quad$ HNCH$_2$OCH$_2$NH $\longrightarrow$ HNCH$_2$NH releases formaldehyde as a (direct) volatile by-product or as a reactant which forms a methylol group ultimately leading to another volatile (CH$_2$O or H$_2$O) by-product.

The methylol group (—CH$_2$OH) is distinctly hydrophilic (i.e. highly attracted to and/or compatible with water). Unreacted —NH$_2$ groups, particularly the —COHN$_2$, —CSNH$_2$, —SO$_2$—NH$_2$ are also hydrophilic in character, as the term is used in the surfactant field; and even the theoretical

HNCH$_2$OCH$_2$NH has hydrophilic characteristics to a less extent. The repeating (—NCH$_2$—)$_n$ linkage, however, in the instant resin or condensate structure (particularly in the presence of distinctly hydrophilic benzene rings preferably present in the condensate structure) has much less hydrophihlic characteristics.

Solvent and surfactant chemists will recognize that in the amine resin formers the unreacted —NH$_2$ groups (particularly the —COHN$_2$, —CSNH$_2$ and the —SO$_2$NH$_2$) are hydrophilic in character. As evidence of this, most of these amine resin formers possess some, if not always very good, water solubility; but once they are reacted with formaldehyde to form the initial methylol groups (—NCH$_2$OH)

in the condensate structure, the hydrophilic character of the material becomes very apparent as the methylol product appears to go into aqueous solution comparatively easily. In many of the examples reference is made to stirring the aqueous-formaldehyde system with the melamine, e.g., until it is uniformly dispersed which is the visual evidence of formation of at least a sufficient number of methylol groups (on the melamine molecule) to receive the resulting reacted (methylol) melamine into a homogenous reaction mass as a solute or as such discrete hydrophilic sol-gel type colloidal particle that solution appears to have taken place.

The resin chemist thinks of the amine-aldehyde resin-forming condensation as passing successively through the A-, B- and C-stages. The A-stage involves essentially the methylol group formation (Equation 1) with probably some polymerization (Equations 2, 3) but is evidenced by the distinct hydrophilic character of the A-stage condensation reaction product. Next, the B-stage condensation reaction product is formed by continued condensation-dehydration reaction (predominantly Equation 4) with the hydrophilic-hydrophobic balance shifting toward the hydrophobic or at least toward aqueous insolubility in the reaction product. The B-stage resinous product is still soluble in certain solvents, with solubility ranging from nominal water solubility, to reasonably good aqueous-alcoholic solubility, to very good solubility in acetone, dimethyl formamide, etc. Chemically the B-stage is not fully condensed in the sense that all the methylene linkages are formed (Equation 4 or 6), but its molecular or colloidal size has affected its solubility characteristics.

Another species of B-stage resin is the alcoholated condensate which is formed from an A-stage or B-stage condensate having a significant number of methylol groups, according to the following:

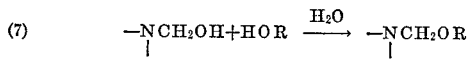

wherein R is preferably a $C_1$-$C_4$ alkyl, i.e. methyl, ethyl, propyl, isopropyl, butyl, etc. group.

It will be appreciated that the alcohol used in preparing such alcoholated condensate is determinative to quite an extent in connection with the hydrophobic-hydrophilic balance of the system. For example, a butylated B-stage melamine-formaldehyde resin is substantially hydrophobic as such, but the resin will still undergo further condensation with release of volatile material in the form of butyl alcohol (as well as water, since all of the methylol groups are ordinarily not reacted with alcohol in this resin). The resin will then undergo an advancement of condensation with release of volatiles. Moreover, the butyl alcohol thus released from and/or already present in uncombined form in a butylated B-stage melamine-formaldehyde resin is highly compatible with and/or a solvent for such butylated resin; and such butylated resin (in its various stages of condensation) is incompatible with vehicle X.

In general, the amine-aldehyde condensates used in the dispersed phase hereof preferably are aromatic-condensates, which have low melting or softening temperatures, being in many cases liquids, soft pastes, etc. at room temperature or lower; but in the practice of the invention condensation of the dispersed phase is preferably carried out in situ. to raise the melting or softening temperatures (i.e. at least about 20° to 50° C.) at least sufficiently to evidence a significant advancement in condensation.

Thus, the condensate having a first range of softening temperature (e.g. about 50° to 60° or less) is subjected to conditions advancing the condensation to obtain a second range of significantly higher softening temperature (e.g. at least about 65°–70° C. with toluenesulfonamide-formaldehyde resins but preferably at least above 100° C.).

It is believed that the unique, generally spheroidally shaped, extremely minute dispersed particles in the resulting dispersion X of the invention are thus due to a most unusual combination of phenomena taking place for perhaps only an extremely short period of time in the environment of the violent agitation of the emulsion. Included in these phenomena is apparently liquification of the condensate particles simultaneously with a maximum dispersive effect in the vehicle X (which may be that already described as resulting from the effect of at least the momentary presence in the system of solvents such as water, alcohol, etc. which are highly compatible with the condensate particles and render the condensate particles highly incompatible with the vehicle X). The mere fact that the condensate may be heated above its softening point would not appear to account for the unique results obtained. Nor are these results completely explained by the fact that the present "chemical" condensation reaction necessarily causes sufficient molecular activity in the body of the condensate to effect liquification thereof (although superior results are usually obtained in the practice of the invention if a significant advancement in condensation takes place). It is believed that these factors, if used, contribute to the result, however, with still other factors which would seem to include a transitory plasticizing effect which the solvent component imparts to the condensate particles. It is known that a non-solvent or a solvent, when used in combination with substantial quantity of compatible solid which imbibes the same, functions as a plasticizer dispersing through body of the solid to depress the solid state softening point or (as may be the case here) in liquid state to reduce the viscosity, the surface tension, the intramolecular attraction within liquified condensate particles, and, perhaps, the forces which might tend to cause agglomeration or coagulation among the ultimately formed discrete particles of colloid and/or micelle size (e.g. 50 to 100 A. sizes) in the dispersion X.

If it is desired to depress the softening point of the condensate of the invention that is employed in product X, such condensate may be empolyed in combination with at least about 5 to 10% of any solvent therefor, so long as such solvent is incompatible wtih vehicle X, in the sense that it does not render the material miscible with vehicle X. For example, a thermoplastic amine-aldehyde resin containing 10% of a volatile solvent therefor, such as dimethyl formamide may be used as the product X in the practice of the instant invention to obtain superior results.

EXAMPLE 8

A resin is prepared in accordance with the procedure of Example 3 of Kazenas Patent No. 2,809,954 and product X is formed by thoroughly admixing therewith dimethyl formamide (in an amount equal to 10 weight percent of the resin). In such product X, the dimethyl formamide is a highly compatible solvent for the resin, which used in the small amount here specified also functions as a compatible plasticizer effectively reducing the softening point of the resin.

A charge of 55 grams of such product X and 35 grams of the aforesaid blend Y is thoroughly mixed and subjected to the high speed dispersion hereinbefore described, but such dispersion is carried out in a closed mixing vessel to avoid premature escape of the dimethyl formamide. Preferably, when a uniform dispersion is obtained at the temperature of 160–165° C., the vessel may be opened to permit the escape of the dimethyl formamide; and heat is removed and, while cooling to 140° C., a charge of 10 grams of boiled linseed oil is added with 10 grams of Inkol-O, and the resulting material is cooled on down to room temperature with continued agitation, to obtain spheroidal resin pigment particles of approximately one micron in size.

It will be appreciated that in the foregoing procedure of Example 8, the plasticizer-solvent (dimethyl formamide) that is used is comparable in properties to dyes used with this type of resin, in that this plasticizer-solvent has a much greater affinity and/or solubility in the pigment resin than in any of the components of vehicle X. In this way this plasticizer-solvent will either tend to migrate toward the pigment resin or tend to be retained in the pigment resin during the dispersing procedure. Even if the plasticizer-solvent is a volatile material such as dimethyl formamide, while the agitation is carried out in the closed vessel and the dimethyl formamide is retained in the system, it will be found that this material has a greater affinity for, compatibility with and/or solubility in the pigment resin or condensate than in the vehicle X.

It will be noted that the substantially uniform dispersion of the plasticized resin particles is obtained at about 100° C., which is below the softening point of this resin (without the dimethyl formamide). It will be found that a finer particle size of dispersion is obtained if the amount of dimethyl formamide employed in preparing the initial product X is 50 to 100% of the weight of the resin, so that a better dispersing effect from the solvent may be obtained.

It will be appreciated that the process of this invention may be carried out at a temperature below the softening point of this resin (i.e., 115° C.) using an initial amount of volatile solvent (e.g. acetone) sufficient to depress the resin softening point, and volatilizing such solvent from the agitated emulsion.

EXAMPLE 9

As previously indicated, it it preferred in the practice of the instant invention to employ the procedure described in detail in Example 1, involving a substantial advancement of the condensation-dehydration reaction during the dispersion or violent agitation. The run of Example 1 is repeated using in place of the mixture of o- and p-toluenesulfonamides hereinbefore described, an equal molar proportion of commercially available p-toluenesulfonamide, and it is found that substantially the same results in dispersion X are obtained. Repeating the same procedure using alpha-toluenesulfonamide in place of the p-toluenesulfonamide, one also obtains substantially the same results.

It is found that comparable results are also obtained carrying out the procedures of Example 1, using various other conventional or known vehicles as the vehicle X. For example, a first vehicle X formed by mixing a charge of commercially available 50% styrenated alkyd resin in an aromatic petroleum solvent with a K.B. value of 74.5, having approximately the viscosity of the vehicle X of Example 1, is used in the procedure of Example 1 to obtain comparable results. Likewise, comparable results are obtained using a vehicle X having substantially the same viscosity, but formed of a commercially available styrenated long oil alkyd in approximately a 50% solids mineral spirits solution (the styrenated alkyd resin component being a semi-drying soya dehydrated castor oil alkyd modified with 40 weight percent of vinyl toluene, "Siopol 66NM"). Comparable results are obtained using, as a vehicle X, a phthalic anhydride-dehydrated castor oil alkyd or a phthalic anhydride-linseed oil alkyd, in each case diluted in mineral spirits to obtain the viscosity desired. Still another vehicle X that is used in commercial "Scopol 55N/290" (a semi-drying dehydrated castor oil esterified with glycerol and copolymerized with 20% of vinyl toluene in a 60% solids solution in a 260–290° C. petroleum distillate).

Comparative results are also obtained using the procedure of Example 1, but using in place of the melamine an equi-molar proportion of such other polyamino resin formers described herein as urea, thiourea, guanadine, guanazole, dicyandiamide, benzoguanamine, etc.

Comparable results are also obtained by carrying out the procedures of Example 1 using other sulfonamides, which are aromatic sulfonamides formed of a sulfonamido group attached to a benzene or benzyl group which may have one or two $C_1$–$C_4$ alkyl groups attached to the benzene nucleus. For example, comparable results are obtained using o-toluenesulfonamide, benzene sulfonamide, or p-ethyl benzene sulfonamide as the sulfonamide component.

The resulting dispersions X are diluted further and driers are added to produce printing inks in each case.

Another feature of the instant invention which significantly affects the ultimate particle size of the dispersed pigment resin is the viscosity of the continuous phase or vehicle X and the manner in which it is affected by the temperature employed and/or the concentration of solids-film-forming or second resin therein. In the liquid vehicle X or continuous phase, a solid-film-forming or second resin is incorporated so as to impart thereto a viscosity suitable for producing the desired shearing effect for fine particle production. A composition suitable for use as a liquid vehicle for an ink may have a total solids content of approximately 50% (and preferably about 25% to 75%), and this should be a free-flowing vehicle X. Actually, the total weight percent of film-forming solids may range from about 5% or 10% of high molecular weight material to as much as even 100% of a low molecular weight material in various ink vehicle compositions. In carrying out the agitation at an elevated temperature, however, a relatively high solids content or high molecular weight material in the vehicle X is desirable in order to impart the necessary viscosity to this phase. It will be appreciated that the total solids content of a final ink formulation, includes the solid dispersed pigment resin plus the solids dissolved in the continuous liquid vehicle phase. In the practice of the instant invention, during the agitation and condensation, it is preferable to employ a "concentrate" composition, wherein the weight ratio of dispersed phase to liquid vehicle X, as the continuous phase, may range from about 1:1 to about 2:1. In such a "concentrate," the liquid vehicle X which contains dissolved solids preferably has a solids to liquid ratio of 1:4 to 3:2 (with the best results being obtained in the range of 2:3 to 1:1). Preferably the weight ratio of (1) dispersed phase to (2) continuous phase in the ink compositions hereof is within the range of 1:10 to 15:10.

The term "selective light absorbing agent" as employed herein and in the claims is to be understood to mean materials which absorb electromagnetic radiation (both visible and invisible) such as for example ultraviolet absorbers, infrared absorbers, opacifiers, reflecting agents, powdered metals, pigments, dyestuffs and other coloring agents (which would involve absorption of radiation in the range of about 3000 to 3200 up to 8000 to 10,000 A.).

The term "coloring agent" as employed herein and in the claim is to be understood to mean materials such as, for example, pigments and dyestuffs (with or without associated reflecting and opacifying agents) which impart color or hue to the dispersed phase. The term "fluorescent agent" is to be understood to mean materials which impart to the dispersed phase the property of emitting visible light under fluorescigenous energy. The term "daylight fluorescence" is to be understood to mean materials which impart to the dispersed phase the property of exhibiting color due to the phenomenon of selective reflection and absorption as well as fluorescence in response to visible light (i.e. natural sunlight or artificial polychromatic light generally referred to as "white" light), which would be dissipated as heat by subtractive colors.

EXAMPLE 10

A charge of 25 grams of water, 1 gram of borax (decahydrate) and 2 drops of 70% phosphorous acid are thoroughly admixed with stirring at 90° C. 52 grams of 91% (active) paraformaldehyde is then thoroughly dispersed in the reaction mixture and this is followed by a charge of 0.75 gram Rhodamine B Extra. Then is added a charge of 33 grams of urea with continued stirring and heating to 100° C. until a uniform dispersion is obtained in the resulting product X.

To the above product X is added 55 grams of vehicle X (consisting essentially of 60% solids in the form of a 45% vinyl-toluene alkyd copolymer resin and 40% Inkol-O) and 15 grams of the zinc stearate blend employed in Example 11. The resulting mixture is emulsified by violent agitation in the paint mill at 95° C. initially, and then with continued heating up to 155° C. to obtain the resulting dispersion X having the properties of the invention hereinbefore described. The dispersed phase herein is thermoset, and dispersion X may be used as a printing ink (preferably modified in conventional manner with ink additives.)

EXAMPLE 11

A charge of 25 grams of water, 1.0 gram of borax (decahydrate) and 2 drops of 70% phosphorus acid are thoroughly admixed with stirring at 90° C. A charge of 21.4 grams of 91% (active) paraformaldehyde is then thoroughly dispersed in the reaction mixture, and this is followed by a charge of 1.5 grams Brilliant Yellow 6G and 0.75 gram of Rhodamine B Extra. Then is added a charge of 14.2 grams of melamine with continued stirring; followed by 28.3 grams of m-benzenedisulfonamide and 19.3 grams of a mixture of o- and p-toluenesulfonamide and stirring and heating to 100° C. is continued until a uniform dispersion is obtained in the resulting product X.

Vehicle X is prepared by thoroughly admixing 52 grams of the vehicle employed in Example 10 and 15 grams of a blend prepared by admixing 12 grams of Pale "H" linseed oil, 6 grams of tung oil and 8 grams of technical grade zinc stearate (the blend is melted together at 200° C., air cooled and milled in a three roll mill till the stearate is dispersed).

Vehicle X at room temperature is added to product X at 95° C. with high speed stirring in the paint mill at 95° C. until the mixture is emulsifiefid; and then with continued heating up to 150° C. to obtain the resulting dispersion X having the properties of the invention hereinbefore described. The dispersed resin herein is thermoset.

In referring particularly to printing ink compositions of the invention it would not be improper to call such compositions colloids. The compositions of the invention appear to have many, if not all, of the essential properties of colloids. The colloid dispersed particle size range from about one micron to 10 A. (Angstroms) is a characteristic of the preferred compositions, and the best compositions (e.g., Example 1) have dispersed particles with sizes of about the wavelength of visible light and less (e.g., about 6000–7000 A. ranging perhaps down to approximately 10–100 A.). These preferred particle sizes are obtained when condensation or polymerization of the dispersed phase resin particles is advanced in situ in the vehicle.

The dispersed particle size is not necessarily limited to a maximum of one micron, since excellent printing ink compositions of the invention can be obtained with dispersed particle sizes up to 5 or 6 microns. (Those of about 1 micron or less are superior, however, in inks.) An additional colloidal characteristic present is the relative uniformity of dispersed particle sizes resulting in a composition made in the practice of the invention. Thus, with the larger (and more readily measured) particle sizes, e.g., Example 2, it will be noted that an average size of 2–5 microns is obtained in a range limited substantially to about 1½–6 microns, which means that the particles are substantially all within about ⅓ to three times the average particle size. This is an extremely fine cut (a generally symmetrical particle distribution) that could not possibly be obtained by grinding or other types of particle fracture, separately or in the presence of the vehicle.

The compositions of the invention further distinguish from a system of particles ground in or precipitated chemically from a given vehicle (even if such particles are very fine) for the reason that the instant compositions may behave as intrinsic (as contrasted to extrinsic) colloids; i.e., the surface activity of the particles appears to be that of spontaneously formed, thermodynamically stable colloid. This may well be (and is believed to be) a result of surface activity, surface tension, interfacial forces, etc. created in the orientation of the original emulsion, and carried over during the solidification of the particles in situ.

Ground particles or those formed by chemical precipitation of materials from a solution in the vehicle have a characteristic rough surface; and the particles of the invention, particularly in the larger and more readily observed sizes (e.g., 0.5 to 5 microns) are found to be rounded or spheroidal in shape. The optical properties obtained in the invention demonstrate dramatically this physical property.

It will be understood from the instant disclosure that the term in situ, with reference to fine particle formation in the continuous phase, does not preclude certain alteration, dilution, concentration, etc. of the continuous phase subsequent to such formation in situ. Subsequent essential or fundamental changes in or complete replacement of the continuous phase (e.g., complete replacement of the oil-modified alkyd by water) would ordinarily not be desirable or typical of this concept. Consistent with the colloid concept, the in situ particle formation, of course, does not preclude subsequent addition of ink or paint diluents or thickeners, driers, modifiers, etc. Such modifications of the continuous phase or vehicle, of course, do not contemplate significant particle flocculation or other phenomena inconsistent with the contemplated uses, e.g., as printing inks etc. It is significant to note that at least certain of the more important materials and/or characteristics of the continuous phase present during such in situ particle formation are retained, and this is because it is believed that a certain particle orientation vis-a-vis the continuous or vehicle phase is developed in the invention at an early stage, e.g., when the dispersed (liquid) phase of the emulsion is initially formed, and this is retained during the subsequent chemical and/or physical changes of the dispersed phase in situ in the vehicle (e.g., from dissolved condensate to water-carrying condensate to water-free condensate, and through the phase change from liquid to solid, or in the case of some thermoplastic pre-condensed resins, through the solid-liquid-solid phase change sequence). This leads, it is believed, to the creation of unique stabilizing forces or phenomena in the dispersion system.

The stability (i.e. colloid-like stability) of the instant compositions is an important characteristic. In preferred form the particle concentration is substantial, but the presence of repelling electrical charges on the particles cannot be discounted. Probably, the more important factor of this stability is apparently hydration (or solvation) as the terminology is used with respect to an alleged absorbed layer or layers of vehicle in the particles preventing them from touching each other (and flocculating). The phenomena involved in such stabilization are believed to occur at least in part, if not substantially at the time the instant particles go through solidification from a liquified state in situ.

As in the case of practically all colloids or other dispersions, a complete description is not possible. One essential, common characteristic of the instant composition is that the dispersed phase solid particles are formed in situ in the continuous phase or vehicle, such in situ formation in every case being involved with a distinct energy change, usually a heat energy change concurrent with in situ particle formation. It will be appreciated that a distinct energy change could involve the release of the energy of a catalyst for effecting advancement of the condensation in situ. For example, by incorporation of acid, latent catalysts, benzoyl peroxide, etc. in product X, just prior to emulsion in the vehicle X, one could advance the condensation reaction materially in the dispersed phase in situ (after emulsion), without the necessity of applying heat externally. This type of energy change in the system, however, usually effects an internal heat generation.

In general, the energy change in the dispersion should be at least equivalent to (and/or manifested by) a temperature change of 10° to 20° C.; and usually a much more substantial temperature change is employed. In Example 1 hereof, addition of vehicle X at room temperature to the product X at about 95°–100° C. drops the mixture temperature to at least about 80° C. The initial emulsion forms quickly and is then heated probably about 50° C., with continued agitation, and with the dispersed phase in existence, from perhaps 85°–90° up to 140° C., whereat heat input is continued to maintain the temperature of 135–140° C. during volatilization of the water. Then there is a further energy change in the system (over more than 100° C. temperature change), with cooling to room temperature. The production of the final composition thus necessarily involves chemical formation of the particles in situ, advancement of condensation and polymerization (within the particles) in situ, heating of the particles in situ, liquified (condensed resin) particles in situ, solidification of the particles by cooling in situ, physical formation of the particles in situ etc.

The foregoing is the preferred process and results in the preferred composition of stable colloid characteristics, having particle sizes generally of not more than the wavelength of visible light (i.e. which cannot be resolved in an optical microscope and are thus less than about 0.6 micron or 6000 A.). The preferred particles are thus condensed in situ. Expressed otherwise, condensation is advanced within the particles in situ. Thermoplastic particles thus condensed in situ solidify in situ by cooling (subsequently). The condensation of such particles involves substantial and significant molecular activity with the dispersed particle, in situ in the continuous phase.

In Example 10, conversion to the thermoset resin particles in situ (i.e. solidification in situ without cooling) takes place, but otherwise all of the previously mentioned phenomena involve the particles in situ (i.e. condensation, polymerization, liquification, solidification, etc. all with energy or temperature change). There is undoubtedly an instant when each dispersed particulate component passes from liquid to solid phase, in the thermosetting process, in situ in the vehicle or continuous phase (i.e. it is solidified in situ).

The advancement of condensation in situ is not limited to the condensation-dehydration (Equations 2, 3 and 4) of amine-aldehyde systems whereby water is eliminated. Such condensation not only involves the overall amine-aldehyde reaction route (which is typical in that it also involves polymerization) but also involves comparable condensations in situ wherein other volatiles (e.g. $CH_2O$ in Equation 6 or butanol in Equation 7) are split off and/or other than amines and aldehydes are condensed (e.g. polyhydric alcohol-polybasic acid, polyamine-polybasic acid, amino-carboxylic acid, aminoalcohol-polybasic acid condensations which split off volatiles). The dispersed phase may be condensed or polymerized in situ and/or partially and/or completely preformed by condensation and/or addition polymerization as thermoplastic resins subjected to liquification and/or solidification in situ in the vehicle. In Example 3 hereof an addition polymer and in Example 4 hereof an epoxide condensate or polymer are processed (by heating) through the dispersed liquid and solid states in situ to form compositions of the invention.

The temperature change in the dispersion and, therefore, in each dispersed particle in situ occurs thus concurrently with at least a momentary liquid state as well as a solid state formation of the particle in situ—by cooling with a thermoplastic resin and by continued heating when a thermoset resin is formed. Even if care is taken to produce a solid dispersed resin particle in situ that is heat-sensitive and readily converted to the thermoset stage (subsequently), this resin will have gone through heating (to liquify) followed by cooling to solidify that is a characteristic of thermoplastic dispersed resin formation of the invention (however, transitory the liquification of the resin per se may have been); moreover, this resin will be thermoplastic or thermo-fusible for at least one more sequence, in situ, when and if it is ultimately converted to the thermoset stage.

We, therefore, conclude that the dispersed phase particles must be solidified in situ. They must be heated and solidified in situ in case of thermoset resins, and solidified by cooling in situ in the case of thermoplastic resins. In either case they have passed from a liquid to a solid state in situ, whether the liquid state is produced by heating the pre-formed resin per se (Example 2) or in a plasticized form (Example 8), or by condensation or polymerization (Examples 1, 6, 7, 10 and 11). In every case the liquid-to-solid state transition in situ involves a significant (heat) energy change, e.g., cooling (Example 2), heating and cooling (Example 1), heating to fuse the resin and evaporate the plasticizer and then cooling (Example 8), heating to condense and polymerize and then cooling (Example 1), heating to condense, polymerize and thermoset (Example 10).

In the system of Example 2 hereof, it will be appreciated that both the pre-formed resin and the vehicle may be heated separately to temperatures above the fusion temperature of the resin and then the emulsion may be formed with agitation and a subsequent heat change of cooling only of the particles in situ to solidify the same.

The important, common feature thus involves particle solidification in situ and a significant (heat) energy change involving the particles in situ, at one time or another in the liquid state. The unusual molecular activity within the particles and with respect to the vehicle vis-a-vis the particles thus involved is significant in characterizing the processes and compositions of the invention.

Preferably, the particles thus formed consist essentially entirely of organic resinous body (plus dye) being formed of not more than about 20% by volume of inorganic material (e.g., fillers, etc.), although in certain instances inorganic pigments may be used in greater amounts (Example 5), if the pigment particle size is extremely fine, the pigment adheres well to the resin during resin particle formation, etc. In using such inorganic pigment care must be taken to prevent loss of advantages of the invention resulting from the in situ formation of the spheroidal discrete resin pigment particle shape, (colloidal) stability characteristics, and for this reason very fine inorganic particle sizes of less than at least about 1/5 the dispersed phase larger resin particle (diameter) sizes of the invention should be used, and preferably the inorganic particle size is about one micron or less.

It will be appreciated that the conventional printing ink additives are used in the practice of the instant invention in order to obtain superior results. For example, conventional printing ink driers such as the known polyvalent metal carboxylates, i.e., the naphthenates and the octoates of such polyvalent metals as cobalt, manganese, lead, zirconium and the like are used to advantage in the practice of the instant invention. Conventional printing ink solvents, such as those already described, are also used in amounts to obtain the desired results. Such printing ink solvents include aliphatic medium boiling solvents (i.e., within a range of about 250–350° F.), kerosene compositions, hexane, aliphatic naphthas, textile spirits, unbodied oils such as tung oil, boiled linseed oil, pale "H" linseed oil, and the like; and such printing ink solvents are used with the conventional plasticizers indicated herein, when desired.

The aforesaid printing ink driers are added in the usual small amounts employed for conventional printing ink use. Also, printing ink anti-skinning agents such as eugenol, antioxidants, or the like may also be added in small amounts characteristic for this use. Lubricants such as the known stearates, waxes, or the like may also be added to advantage in the practice of the instant invention.

It will be appreciated that the known driers, solvents, anti-skinning agents, lubricants, plasticizers and the like employed conventionally in printing inks are used in the practice of the instant invention and, in fact, this is one of the advantages of the instant invention in that it permits the use of these conventional materials.

It will be understood that modifications and variations may be effected without departing from the spirit and scope of the novel concepts of the present invention.

We claim as our invention:

1. A process of producing a printing ink composition, which comprises the steps of (a) subjecting a dispersion of (1) a dispersed phase of substantially uniform fine globules formed essentially of substantially water-insoluble substantially translucent synthetic aromatic resin body in a (2) continuous liquid phase formed of a substantially-translucent-solid-film-forming ink vehicle, in which the dispersed phase is substantially insoluble, to time-temperature conditions effecting solidification in situ of dispersed phase particles in the liquid phase in a size range of not more than 0.0003 inch; and (b) intimately dispersing in the dispersion a selective light absorbing agent which is retained by the resin body, in a size range of not more than one-fifth the average dispersed phase particle size, said continuous phase liquid vehicle being composed of at least substantially 40 weight percent oil-modified benzenoid alkyd resin, and the weight ratio of dispersed phase to continuous phase being substantially 2:1 or less.

2. A process as claimed in claim 1 wherein the light absorbing agent is substantially molecularly dispersed in and retained by said resin body.

3. A process as claimed in claim 1 wherein the light absorbing agent is an inorganic pigment.

4. A process as claimed in claim 1 wherein the light absorbing agent is initially dispersed in the dispersed phase resin and is introduced into said dispersion therewith.

5. A process as claimed in claim 1 wherein the light absorbing agent is introduced into the dispersion while the dispersed phase globules are in liquid form and migrate to such globules prior to solidification thereof.

6. The method of claim 1 which comprises an additional step of thoroughly admixing into the dispersion conventional ink diluents, lubricants, driers and plasticizers as required for printing ink formulation.

7. The method of claim 1 wherein said weight ratio is substantially 2:1 to 1:1.

References Cited

UNITED STATES PATENTS

| | | | |
|---|---|---|---|
| 2,653,919 | 9/1953 | Hunter | 260—34.2 |
| 2,776,267 | 1/1957 | Weber et al. | 260—21 |
| 2,938,873 | 5/1960 | Kazenas | 252—301.2 |
| 2,155,863 | 4/1939 | Jacobson | 260—45.1 |
| 2,635,083 | 4/1953 | Cordier | 260—67.5 |

TOBIAS E. LEVOW, *Primary Examiner.*

R. D. EDMONDS, *Assistant Examiner.*

UNITED STATES PATENT OFFICE
CERTIFICATE OF CORRECTION

Patent No. 3,412,104                          November 19, 1968

Maurice Dwight McIntosh et al.

It is certified that error appears in the above identified patent and that said Letters Patent are hereby corrected as shown below:

Column 1, line 62, "par" should read -- par- --. Column 4, line 21, "quanazole" should read -- guanazole --; line 24, "desclosed" should read -- disclosed --. Column 5, line 23, "pratice" should read -- practice --. Column 10, line 28, "colled" should read -- cooled --. Column 11, line 52, cancel "is". Column 12, line 36, "hydrophilic" should read -- hydrophobic --; line 38, "hydrophihlic" should read -- hydrophilic --. Column 13, line 68, "fatcors" should read -- factors --; line 75, after "through" insert -- the --. Column 14, line 10, "empolyed" should read -- employed --; line 12, "wtih" should read -- with --. Column 15, line 28, "Siopol" should read -- Scopol --; line 32, "in" should read -- is --. Column 16, line 23, "claim" should read -- claims --. Column 17, line 7, "emulsifiefid" should read -- emulsified --.

Signed and sealed this 5th day of May 1970.

(SEAL)
Attest:

EDWARD M. FLETCHER, JR.                     WILLIAM E. SCHUYLER, JR.
Attesting Officer                             Commissioner of Patents